United States Patent [19]

Fullerton

[11] Patent Number: 4,641,317
[45] Date of Patent: Feb. 3, 1987

[54] SPREAD SPECTRUM RADIO TRANSMISSION SYSTEM

[75] Inventor: Larry W. Fullerton, Huntsville, Ala.

[73] Assignee: Charles A. Phillips, Ardmore, Tenn.; a part interest

[21] Appl. No.: 677,597

[22] Filed: Dec. 3, 1984

[51] Int. Cl.⁴ .................. H04B 15/00; H04K 1/00; H04L 27/30
[52] U.S. Cl. ........................... 375/1; 375/23; 375/115
[58] Field of Search ............... 375/1, 115, 2.1; 370/10, 107; 329/107; 332/9 R; 307/265, 271; 455/26; 178/22.01

[56] References Cited

U.S. PATENT DOCUMENTS

| | | | |
|---|---|---|---|
| 3,806,795 | 4/1974 | Morey | 324/6 |
| 4,070,550 | 1/1978 | Miller, Jr. et al. | 375/23 |
| 4,324,002 | 4/1982 | Spilker, Jr. | 375/23 |
| 4,380,746 | 4/1983 | Sun et al. | 375/23 |

OTHER PUBLICATIONS

Bennett et al., "Time–Domain Electromagnetics and its Applications," Proceedings of the IEEE, vol. 66, No. 3, Mar. 1978.

Cook, J. C., "Monocycle Radar Pulses as Environmental Probes," Institute of Science and Technology, The University of Michigan.

Primary Examiner—Robert L. Griffin
Assistant Examiner—Stephen Chin
Attorney, Agent, or Firm—C. A. Phillips

[57] ABSTRACT

A communications system wherein an intelligence signal modulates the spacing of relatively narrow pulses of a fixed rate pulse train, and these pulses key on a transmitter which employs a pair of series connected avalanche mode operated transistors. These are repetitively powered via a charged coaxial delay line, and the output, appearing across a resistive load, is fed directly, or through a shaping filter, to a discone transmitting antenna. At a receiving location, the received signal is amplified by a wide band amplifier and fed through a reverse contoured filter (of the transmitting filter, if one is employed). The signal is detected via synchronous detection which locks onto the received pulse train, after which the modulation evidence by the pulse train is recovered by a low pass filter.

12 Claims, 4 Drawing Figures

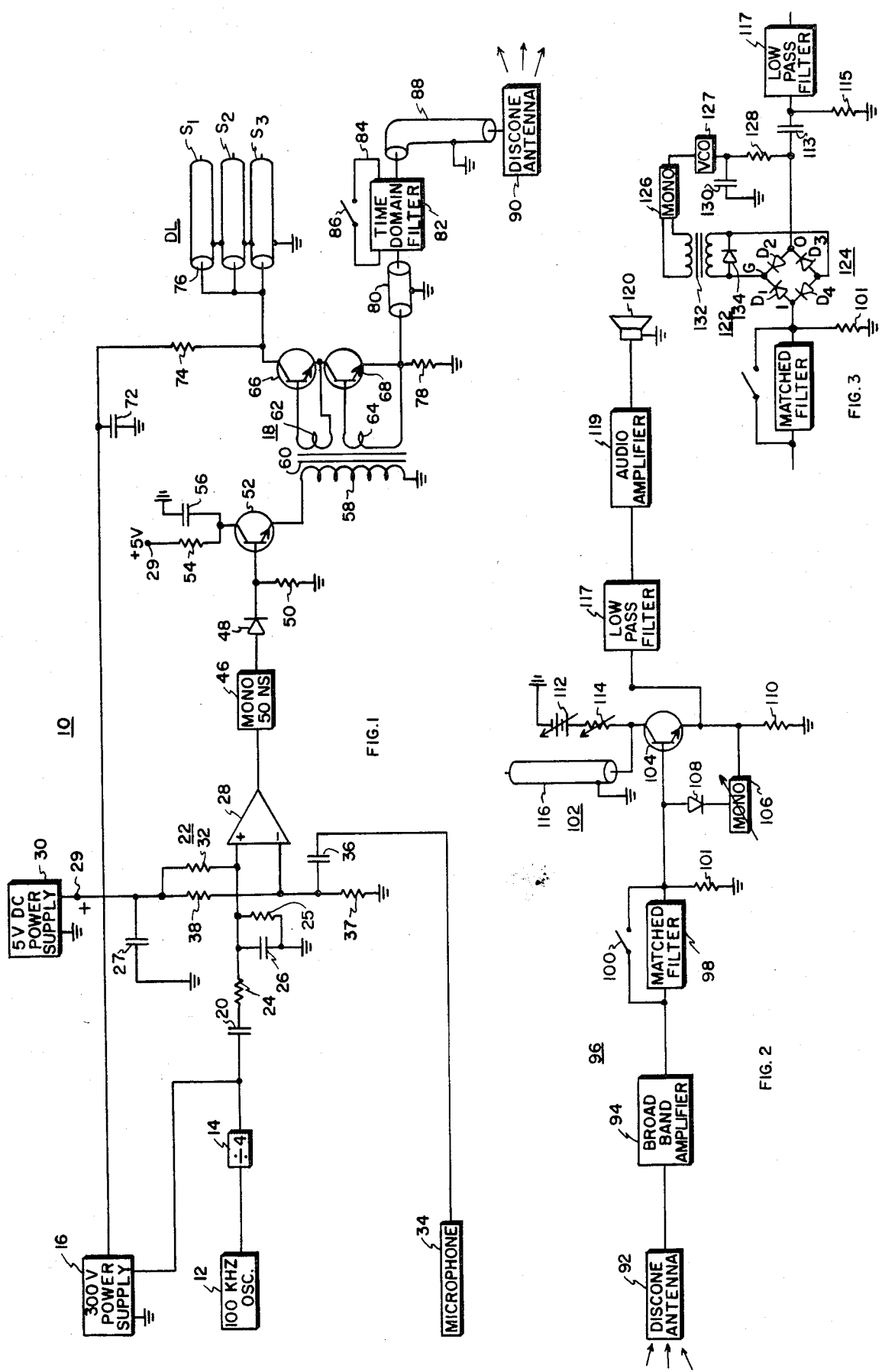

SPREAD SPECTRUM RADIO TRANSMISSION SYSTEM

FIELD OF THE INVENTION

The invention relates generally to radio transmission systems, and particularly to a spread spectrum type system wherein discrete frequency signal components are generally below noise level and are thus not discernable by conventional radio receiving equipment.

BACKGROUND OF THE INVENTION

The radio transmission of communications signals, for example, audio signals, is normally effected by one of two methods. In one, referred to as an amplitude modulation system, a sinusoidal radio frequency carrier is modulated in amplitude in terms of the intelligence or communications signal, and when the signal is received at a receiving location, the reverse process, that is, demodulation of the carrier, is effected to recover the communications signal. The other system employs what is termed frequency modulation, and instead of amplitude modulation of the carrier signal, it is frequency modulated. When an FM frequency modulation or FM signal is received, circuitry is employed which performs what is termed discrimination wherein changes in frequency are changed to changes in amplitude and in accordance with the original modulation, and thereby a communications signal is recovered. In both systems, there is as a basis a sinusoidal carrier which is assigned and occupies a distinctive frequency band width, or channel, and this channel occupies spectrum space which cannot be utilized by other transmissions within the range of its employment. At this time, almost every nook and cranny of spectrum space is being utilized, and there is a tremendous need for some method of expanding the availability of communications channels. In consideration of this, it has been suggested that instead of the use of discrete frequency channels for radio communications links, which is the conventional approach, a radio transmission link employing a wider frequency spectrum which may extend over a range of 10 to 100 times the intelligence band width being transmitted, but wherein the energy of any single frequency making up that spectrum be very low, typically below normal noise levels. Thus, it would be obvious that this type of transmission would be essentially non-interfering with other services. Making use of this approach, it has been proposed that coded sequence modulations be somehow employed and that each such communications link be non-interfering by virtue of different coded sequences, which would be turnable features.

Significantly, however, as far as the applicant is aware, no known practical systems has been as yet developed by others.

It is the object of this invention to extend the spectrum range of spread spectrum communications to operate in the range of approximately 1,000 to 1,000,000 or more rather than 10 to 100 times the intelligence modulation rate, and to accomplish this with an exceedingly simple and low cost electronic assembly.

SUMMARY OF THE INVENTION

In accordance with this invention, a pulse signal of a fixed or programmed rate is varied or modulated as to the time of turnon of pulses as a function of an intelligence signal. The resultant pulse signals effect the turnon, or triggering, of an avalanche mode operated semiconductor switch powered via a delay line or other similar short duration power sources which may be charged between the time of occurrence of triggering pulses, the switch being turned off within a range of time of from a few picoseconds to on the order of 50 nanoseconds. The resultant pulse output of the switch is coupled to an aresonant transmitting antenna coupled to the atmosphere or space for transmission. Reception of the transmission is effected by a receiver which synchronously effects detection by rendering insensitive detection between the anticipated occurrence of pulse signals.

BRIEF DESCRIPTION OF THE DRAWINGS

FIG. 1 is a combination block-schematic diagram of a spread spectrum transmitter.

FIG. 2 is a combination block-schematic diagram of a spread spectrum receiver as contemplated by this invention.

FIG. 3 is a combined block-schematic electrical diagram of an alternate form of synchronous detector to the one shown in FIG. 2.

DETAILED DESCRIPTION OF THE DRAWINGS

Figure 4:
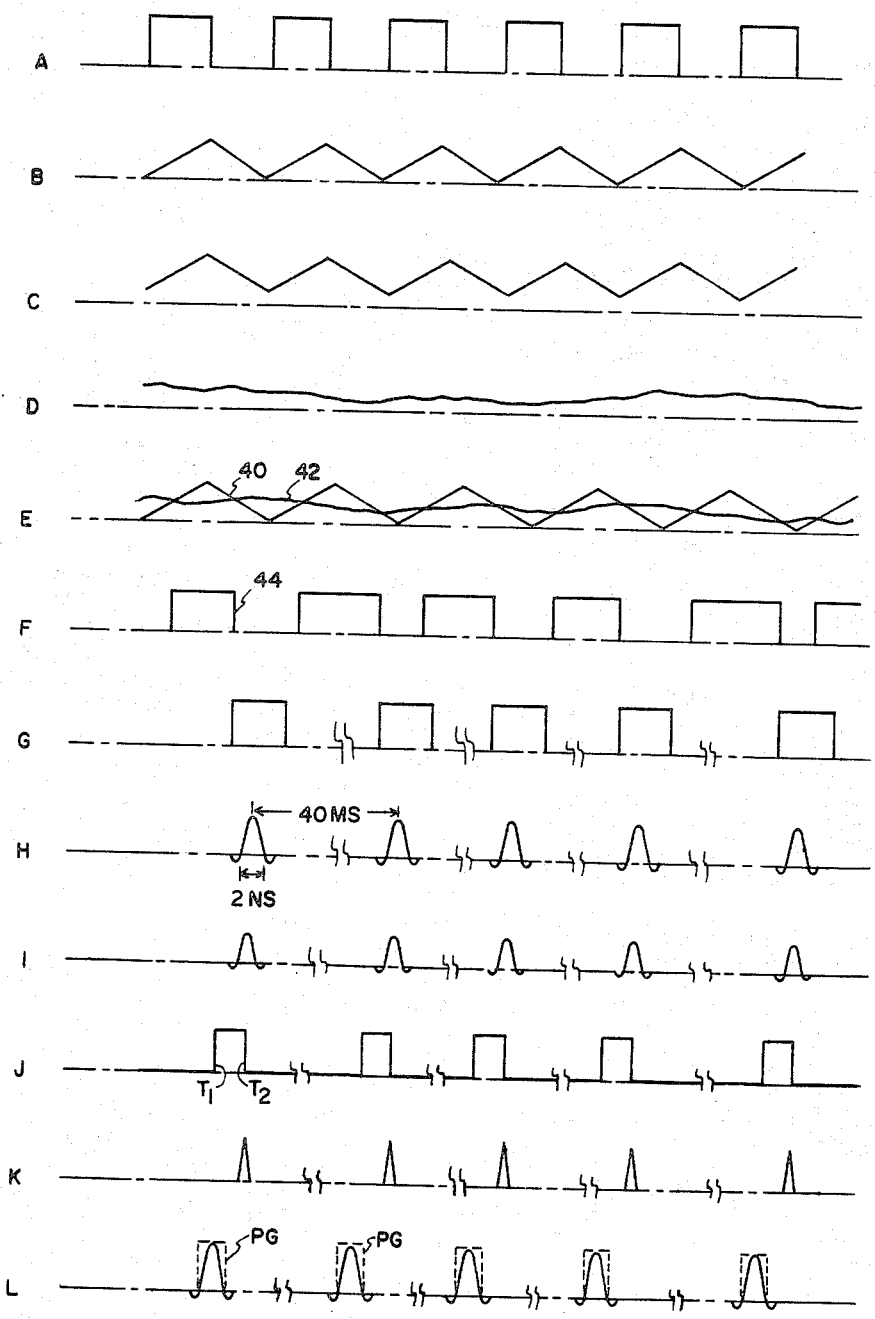
FIG. 4 is a set of electrical waveforms A–L illustrative of aspects of the circuitry shown in FIGS. 1 and 2.

Referring to FIG. 1, and initially to transmitter 10, a base frequency of 100 KHz is generated by oscillator 12, typically being a crystal controlled oscillator which includes conventional circuitry for providing as an output square wave pulses at 100 KHz rate. This pulse signal is applied to divide-by-4 divider 14 to provide at its output a square wave 25 KHz, 0–5 volt, signal shown in waveform A of FIG. 4. Further references to waveforms will simply identify them by their letter identity and will not further refer to the figure, which is FIG. 4 in all cases. This output is employed as a general transmission signal and as an input to power supply 16. The latter is regulated, one which supplies a 300-volt D.C. bias on a non-interfering basis for the output stage 18 of transmitter 10, which is also keyed at the 25 KHz rate.

The output of divide-by-4 divider 14 is employed as a signal base and as such is supplied through capacitor 20 to pulse position modulator 22. Pulse position modulator 22 includes in its input an RC circuit consisting of resistor 24 and capacitor 26 which convert the square wave input to an approximately triangular wave as shown in waveform B, it being applied across resistor 25 to the non-inverting input of comparator 28. A selected or reference positive voltage, filtered by capacitor 27, is also applied to the non-inverting input of comparator 28, it being supplied from +5 volt terminal 29 of D.C. bias supply 30 through resistor 32. Accordingly, for example, there would actually appear at the non-inverting input a triangular wave biased upward positively as illustrated by waveform C.

The actual conduction level of comparator 28 is determined by an audio signal input from microphone 34 supplied through capacitor 36, across resistor 37, to the inverting input of comparator 28, as biased from supply 30 through resistors 38 and across resistor 32. The combined audio signal and bias is illustrated in waveform D. By virtue of the thus described input combination, the output of comparator 28 would rise to a positive saturation level when triangular wave signal 40 (waveform E) is of a higher value than modulation signal 42 and drop to a negative saturation level when modulation signal 42 is of a greater value than the triangular wave signal 40. The output signal of comparator 28 is shown in waveform F.

In the present case, we are interested in employing the negative going or tailing edge 44 (waveform F) of the output of comparator 28, and it is to be noted that this trailing edge will vary in its time position as a function of the signal modulation. This trailing edge of the waveform in waveform F triggers "on" mono, or monostable multivibrator, 46 having an "on" time of approximately 50 nanoseconds, and its output is shown in waveform G. For purposes of illustration, while the pertinent leading or trailing edges of related waveforms are properly aligned, pulse widths and spacings (as indicated by break lines, spacings are 40 microseconds) are not related in scale. Thus, the leading edge of pulse waveform G corresponds in time to the trailing edge 44 (waveform F) and its time position within an average time between pulses of waveform G is varied as a function of the input audio modulation signal to comparator 28.

The output of mono 46 is applied through diode 48 across resistor 50 to the base input of NPN transistor 52 operated as a triggering amplifier. It is conventionally biased through resistor 54, e.g., 1.5K ohms, from +5 volt terminal 29 of 5 volt power supply 30 to its collector. Capacitor 56 having an approximate capacitance of 0.1 mf is connected between the collector and ground of transistor 52 to enable full bias potential to appear across the transistor for its brief turn-on interval, 50 nanoseconds. The output of transistor 52 is coupled between its emitter and ground to the primary 58 of trigger transfomer 60. Like secondary windings 62 and 64 of trigger transformer 60 separately supply base-emitter inputs of NPN avalanche, or avalanche mode operated, transistors 66 and 68 of power output stage 18. Although two are shown, one or more than two may be employed when appropriately coupled.

Avalanche mode operated transistors 66 and 68, many type 2N2222 with a metal can, have the characteristic that when they are triggered "on", their resistance goes low (e.g., approximately 30 ohms for each) and stays at this state until collector current drops sufficiently to cut off conduction (at a few microamperes). Their collector-emitter circuits are connected in series, and collector bias of +300 volts is applied to them from power supply 16, across filter capacitor 72, and through resistor 74 to one end 76 of parallel connected delay lines DL. While three sections $S_1$-$S_3$ are shown, typically five to ten would be employed. They may be constructed of type RG58 coaxial cable, and each being approximately three inches in length as required to totally effect an approximately 3 nanosecond pulse. As shown, the positive input potential from resistor 74 is connected to the center conductor of each of the delay lines, and the outer conductors are connected to ground. Resistor 74 is on the order of 50K ohms and is chosen to enable charging of the delay lines DL in approximately one microsecond. Voltage dividing resistors 71 and 73, typically of equal values of 1 meg ohm each, provide a load balancing function between the transistors. Delay lines DL are charged to 300 volts bias during the period when transistors 66 and 68 are turned off, between input pulses. When the inputs to transistors 66 and 68 are triggered "on" by a triggering pulse they begin to conduct within 0.5 nanoseconds, and by virtue of the low voltage drop across them (when operated in an avalanche mode as they are), about 120 volts appears as a pulse across output resistor 78, e.g., 50 ohms.

Significantly, the turn-on or leading edge of this pulse is effected by the trigger pulse applied to the inputs of transistors 66 and 68, and the trailing edge of this output pulse is determined by the discharge time of delay lines DL. By this technique, and by choice of length and Q of the delay lines, a well-shaped, very short pulse, on the order of 3 nanoseconds and with a peak power of approximately 300 watts, is generated. Following turn-off, delay lines DL are recharged through resistor 74 before the arrival of the next triggering pulse. As will be apparent, power stage 18 is extremely simple and is constructed of quite inexpensive circuit elements. For example, transistors 66 and 68 are available at a cost of approximately $0.12.

The output of power output stage 18 appears across resistor 78 and is supplied through coaxial cable 80 to a time domain shaping filter 82 which would be employed to affix a selected signature to the output as a form of encoding or recognition signal. Alternately, filter 82 may be omitted where such security measures are not deemed necessary; and, as indicative of this, a bypass line 84 including a switch 86 diagrammatically illustrates such omission.

The signal output of filter 82, or directly the output of power stage 18, is supplied through coaxial cable 88 to discone antenna 90, which is an aresonant antenna. This type of antenna relatively uniformly radiates all signals of a frequency above its cut-off frequency, which is a function of size, for example, signals above approximately 50 MHz for a relatively small unit. In any event, antenna 90 radiates a wide spectrum signal, an example being shown in the time domain in waveform H, this waveform being the composite of the shaping effects of filter 82, if used, and, to an extent, discone antenna 90.

The output of discone antenna 90 is typically transmitted over a discrete space and would typically be received by a like discone antenna 92 of receiver 96 at a second location. Although transmission effects may distort the waveform some, for purposes of illustration, it will be assumed that the waveform received will be a replica of waveform H. The received signal is amplified by broad band amplifier 94, having a broad band frequency response over the range of the transmitted signal. In instances where a filter 82 is employed in transmitter 10, a reciprocally configured filter 98 would be employed. As illustrative of instances where no matched filter would be employed, there is diagrammatically illustrated a switch 100 connecting the input and output of filter 98, denoting that by closing it, filter 98 would be bypassed. Assuming that no match filter is employed, the output of broad band amplifier as an amplified replica of waveform H is illustrated in waveform I. In either case, it appears across resistor 101.

Signal waveform I is applied to synchronous detector 102. Basically, it has two functional units, avalanche transistor 104 and adjustable mono 106. Mono 106 is driven from an input across emitter-resistor 110, connected between the emitter of avalanche transistor 104 and ground. Avalanche transistor 104 is biased from variable voltage D.C. source 112, e.g., 100 to 130 volts, through variable resistor 114, e.g., 100K to 1M ohms. A delay line 116 is connected between the collector and ground of transistor 104 and provides the effective operation bias for transistor 104, it being charged between conduction periods as will be described.

Assuming now that a charging interval has occurred, avalanche transistor 104 will be turned on, or triggered, by a signal applied to its base from across resistor 101. It will be further assumed that this triggering is enabled by the $\overline{Q}$ output, waveform J, of mono 106 being high. Upon being triggered, the conduction of avalanche transistor 104 will produce a rising voltage across emitter resistor 110, waveform K, and this voltage will in turn trigger mono 106 to cause its $\overline{Q}$ output to go low. This in turn causes diode 108 to conduct and thus effectively shorting out the input of avalanche transistor 104, this occurring within 2 to 20 nanoseconds from the positive leading edge of the input signal, waveform I. The conduction period of transistor 104 is precisely set by the charge capacity of delay line 116. With a delay line formed of 12" of RG58 coaxial cable, and with a charging voltage of approximately 110 volts, this period is set, for example, at approximately 2 nanoseconds. One to 25 sections of coaxial cable having lengths of from 0.25" to 300" may be employed, with appropriate variation in on-time.

Mono 106 is adjustable to set a switching time for its $\overline{Q}$ output to return high at a selected time, following it being a triggered as described. When it does, diode 108 would again be blocked and thus the shorted condition on the base input of avalanche transistor 104 removed, enabling it to be sensitive to an incoming signal. For example, this would occur at time $T_1$ of waveform J. The period of delay before switching by mono 106 is set such that renewed sensitivity for avalanche amplifier 104 occurs at time point $T_1$, just before it is anticipated that a signal of interest will occur. As will be noted, this will be just before the occurrence of a signal pulse of waveform I. Thus, with a repetition rate of 25 KHz for the signal of interst, as described, mono 106 would be set to switch the $\overline{Q}$ output from low to high after an essentially 40 microsecond, or 40,000 nanosecond, period. Considering that the width of the positive portion of the input pulse is only about 20 nanoseconds, thus, during most of the time, synchronous detector 102 is insensitive. The window of sensitivity is illustrated as existing from time $T_1$ to $T_2$ and is tunable in duration by conventional timing adjustment of mono 106. Typically, it would be first tuned fairly wide to provide a sufficient window for rapid locking into a signal and then be tuned to provide a narrower window for a maximum compression ratio.

The output signal of avalanche transistor 104, waveform K, is a train of constant width pulses having a leading edge varying as a function of modulation. Thus, we have a form of pulse position modulation present. It appears across emitter-resistor 110, and it is fed from the emitter of transistor 104 to an active type low pass filter 117. Low pass filter 117 translates, demodulates, this thus varying pulse signal to a base band intelligence signal, and this is fed to, and amplified by, audio amplifier 119. Then, assuming a voice transmission as illustrated here, the output of audio amplifier 119 is fed to and reproduced by loud speaker 120. If the intelligence signal were otherwise, appropriate demodulation would be employed to detect the modulation present.

It is to be particularly noted that receiver 96 has two tuning features: sensitivity and window duration. Sensitivity is adjusted by adjustment of variable voltage source 112, and signal "lock on" is effected by tuning of the period of high output state of mono 106 as described. Typically, this period would be adjusted to the minimum necessary to capture the range of excursion of the position modulated signal pulses of interest.

FIG. 4 illustrates an alternate form of detector for receiver 96, it being designated detector 122. In it a form of synchronous signal detection is effected employing ring demodulator 124, formed of four matched diodes $D_1$–$D_4$. In essence, it is operated as a single pole, single throw switch, or simply a gate, with an input appearing across resistor 101 and applied to its input terminal I. Its gated output appears at terminal 0 and is fed through capacitor 113 and across resistor 115 to the input of demodulating, active type, low pass filter 117. Ring demodulator 124 is gated by a pulse PG illustrated in dashed lines in waveform L of FIG. 4 and applied across terminal G. Pulse PG is generated by mono (monostable multivibrator) 126 as controlled by VCO (voltage controlled oscillator) 127. VCO 127 is in turn controlled to effect synchronization with the average rate of the incoming signals shown in solid lines in waveform L. To accomplish this, the output voltage from ring demodulator 124 is fed through resistor 128 and across a (averaging) capacitor 130, connected to the control input of VCO 127. The thus controlled signal frequency output of VCO 127 is fed to the input of mono 126 which then provides as an output gating pulse PG. This pulse is rectangular as shown and having a selected pulse width, typically from 2 to 20 nanoseconds, being selected in terms of the time modulation of the transmitted pulse. It is fed to the primary winding of pulse transformer 132, and the secondary of this transformer is coupled across gate terminals G of ring demodulator 124. Diode 134 is connected across the secondary of transformer 132 and functions to effectively short out the negative transition which would otherwise occur by virtue of the application of the pulse output of mono 126 to transformer 132. In this manner, the gating pulse PG operates to bias all of the diodes of ring demodulator 124 conductive for its duration and thereby gating through the signal input from terminal I to terminal 0. As stated above, this signal input is applied through capacitor 113 and across resistor 115 to the input of low pass filter 117.

The function of detector 122 is provided to low pass filter 117 that portion of the input signal shown in waveform L of FIG. 4 appearing within the confines of gating pulse PG. The time position of gating pulse PG is set by the timing of the pulse outputs of VCO 127, and the rate of the output of VCO 127 is determined by the voltage input of VCO 127 as appearing across capacitor 130. Capacitor 130 is chosen to have a time constant which is just below that corresponding to the lowest frequency of modulation to be demodulated. Thus, the output pulse rate of VCO 127 will be such as not to vary the pulse position of gating pulse PG during modulation induced time positions of the input signal (as shown in solid lines in waveform H). As a result, the average value of the signal which is gated through demodulator 124 will vary as a function of the modulation originally applied to the signal. This average value is translated into an amplitude type intelligence signal by passing it through low pass filter 117. It is then amplified, as desired, by audio amplifier 119 and then reproduced by loud speaker 120.

From the foregoing, it should be appreciated that the applicant has provided at both inexpensive and practical spread spectrum system of communications. It employs the combination of an avalanche mode gated transistor charged from a delay line; and when fed with a modulation induced variable position pulse, provides, as an output, a variable position pulse having a width of one to three nanoseconds. This in turn, of course, enables a large spectrum commencing at about 50 megacycles and extending downward to on the order of 500 megacycles. Thus, with an audio frequence of, say, 5,000 Hz, the energy radiated to transmit this signal is dispersed or spread an almost unbelievable 100,000 times. As a result, interference with a conventional restricted bandwidth signal is essentially eliminated. As an example of the effectiveness of such a system, and employing 20-cent transistors in an avalanche mode, an audio modulated audio leading edge modulated pulse was provided as an output having a peak power of approximately 280 watts. The signal received at a distance of 200 feet had a peak voltage of approximately 1 volt into a 50 ohm load. Actually, the power level necessary to receive has been found to be approximately a few micro-watts, thus the effective range with this power level is considerable. At the same time, a spectrum analyzer at the receiving point failed to reveal any signal present or thus possibility of intereference with other services. Actually, in view of the distribution of the spectrum of the transmitted signal, the level present which might interfere with a standard signal, for example, a 5 KHz width signal, would be on the order of 2.8 micro-watts at the antenna. One way of describing the advantage that this type of transmission has over more conventional ones is to note that power appears in the example during an essentially 3-nanosecond period and appears only every 1,000,000 nanoseconds. Thus, it has a natural power ratio of 33,000:1. Then, by limiting the listening period for that signal at essentially its pulse width, the receiving circuitry is only concerned with its appearance within a tiny window. Accordingly, the overall signal-to-noise ratio is tremendous. It is to be further appreciated that a vast number of users, employing slightly different repetition rates, may be accommodated and even this may be expanded by discrete patterns of pulse timing. Either analog or digital patterns may be employed which, for example, may effect a dithering of the modulated pulse base, with a like or complementary dithering employed on the receiving end. In fact, with little degrees of sophistication, extremely confidential communications can be achieved even as against a receptor who has general knowledge of the presence of this type transmission. Beyond this, its application to radar and motion detectors is essentially unlimited, enabling detection without delays typically required for signal intergration as often required.

What is claimed is:

1. A spread spectrum radio transmission system comprising:
    a radio transmitter comprising:
        pulse generating means for generating reoccurring pulses, said pulses appearing at a selected time spacing,
        a source of intelligence signals, and
        modulation means responsive to said pulses generating means and said source of intelligence signals for providing as an output a train of pulses wherein the leading edge of pulses is varied in time position as a function of intelligence signal;
        avalanche semiconductor switching means, having a control signal input responsive to said output of said modulation means, a bias power input, and a switched power output, for switching power on and off to said switched power output;
        a D.C. bias source coupled to said bias power input comprising a delay line having a delay of 1 picosecond to 50 nanoseconds and delay line charging means coupled to said delay line for charging said delay line between pulses of said train of pulses;
        transmitting antenna means comprising an aresonant antenna coupled to said switched power output and to space for transmitting a signal received from said switched power output; and
    a radio receiver comprising:
        receiving antenna means comprising an aresonant antenna for receiving transmissions from said transmitting antenna means and for providing as an output electrical pulses responsive to the transmitted pulse signals,
        amplification means responsive to the output of said receiving antenna means for amplifying received pulses,
        synchronous detection means, including signal sensitive windowing means having a signal input responsive to the ouput of said amplification means, for responding to, and providing an output for, signals appearing within reoccurring windows of time generally coincident with the average time of occurrence of pulses received by said receiving means and including means for being insensitive to received signals appearing between the occurrence of said windows of time,
        signal conversion means for converting the output of said detection means into a replica of signals of said intelligence signals, and
        signal reproduction means responsive to the output of said signal conversion means for reproducing said intelligence signals.

2. A system as set forth in claim 1 wherein said avalanche semiconductor switching means comprises at least one avalanche transistor connected in a common emitter configuration including said switched power output between the emitter and a common ground, a base as said control signal input, and having a collector as said bias power input.

3. A system as set forth in claim 1 wherein:
    said delay line charging means comprises a D.C. power supply;
    said bias power input and switched power output together comprises first and second terminals; and
    said charging means further comprises a resistor connected between said first terminal and said D.C. power supply of a value which, upon the onset of avalanche conditions of said avalanche semiconductor switching means, would drop the voltage across said avalanche semiconductor switching means to essentially zero.

4. A system as set forth in claim 3 wherein said aresonant antenna of said transmitting antenna means is coupled between said second terminal and said D.C. power supply.

5. A system as set forth in claim 2 wherein said delay line comprises parallel connected 1 to 25 sections of coaxial cable of lengths of from 0.25" to 300", one end of the inner conductor of each said coaxial cable being connected to said collector, the outer conductor of the coaxial delay line being grounded, and the opposite end of the inner conductor being open.

6. A system as set forth in claim 3 wherein said avalanche semiconductor means comprises a transistor, in turn including an emitter coupled to said transmitting antenna means.

7. A system as set forth in claim 6 wherein said switching means comprises at least two avalanche transistors with their collector-emitter circuits connected in series, a resistor, and power output being connected to the emitter of one of said transistors, and said D.C. bias source is connected between said resistor and a collector of another of said avalanche transistors.

8. A system as set forth in claim 1 wherein said synchronous detection means comprises an avalanche transistor having a signal input connected to the output of said amplification means and including adjustable gating means responsive to the occurrence of the leading edge of a signal output of said last-named avalanche transistor for disabling the input of said last named avalanche transistor for selected periods of time between said reoccurring windows of time.

9. A system as set forth in claim 1 wherein said synchronous detection means comprises:
 a ring demodulator having a gating input, a signal input responsive to the output of said amplification means, and a signal output, said signal output comprising an output of said synchronous detection means;
 voltage controlled oscillator means responsive to an average output of said output of said ring demodulation means for providing a pulse output at a frequency corresponding to an average rate of signal output of said ring demodulator means; and
 gating means responsive to the output of said voltage controlled oscillator means for providing a gating input pulse to said ring demodulator means having a selected duration period defining a said reoccurring window of time.

10. A system as set forth in claim 9 wherein said gating means comprises:
 a monostable multivibrator having an input coupled to said voltage controlled oscillator means and an output; and
 a pulse transformer connected between the output of said monostable multivibrator and said gating input of said ring demodulator.

11. A system as set forth in claim 1 wherein said signal conversion means comprises an active type low pass filter.

12. A spread spectrum radio transmission system comprising:
 a radio transmitter comprising:
  pulse generating means for generating reoccurring pulses, said pulses appearing at a selected time spacing,
  a source of intelligence signals, and
  modulation means responsive to said pulses generating means and said source of intelligence signals for providing as an output a train of pulses wherein the leading edge of pulses is varied in time position as a function of intelligence signal;
 transmitting antenna means comprising an aresonant antenna having a switching power input and coupled to space for transmitting a signal;
 switching means, having a control signal input responsive to said output of said modulation means, a bias power input, and a switched power output coupled to said switched power input of said antenna, for switching power on and off to said antenna;
 a D.C. bias source coupled to said bias power input of said switching means; and
 a radio receiver comprising:
  receiving antenna means comprising an aresonant antenna for receiving transmission from said transmitting antenna means and for providing as an output electrical pulses responsive to the transmitted pulse signals,
  amplification means responsive to the output of said receiving antenna means for amplifying received pulses,
  synchronous detection means, including signal sensitive windowing means having a signal input responsive to the output of said amplification means, for responding to, and providing an output for, signals appearing within reoccurring windows of time generally coincident with the average time of occurrence of pulses received by said receiving means and including means for being insensitive to received signals appearing between the occurrence of said windows of time,
  signal conversion means for converting the output of said detection means into a replica of signals of said intelligence signals, and
  signal reproduction means responsive to the output of said signal conversion means for reproducing said intelligence signals.

* * * * *